(12) United States Patent
Huber et al.

(10) Patent No.: US 7,459,661 B2
(45) Date of Patent: Dec. 2, 2008

(54) SYSTEM FOR EVALUATING LUMINANCE AND MOVEMENT WITHIN AN OBSERVATION SPACE, AND METHOD FOR CONTROLLING LIGHT SOURCES WITHIN THE OBSERVATION SPACE

(75) Inventors: Andreas Huber, Traunreut (DE); Gotthard Schleicher, Palling (DE)

(73) Assignee: Patent - Treuhand - Gesellschaft für Elektrische Glühlampen mbH, München (DE)

( * ) Notice: Subject to any disclaimer, the term of this patent is extended or adjusted under 35 U.S.C. 154(b) by 0 days.

(21) Appl. No.: 11/226,376

(22) Filed: Sep. 15, 2005

(65) Prior Publication Data

US 2006/0071153 A1 Apr. 6, 2006

(30) Foreign Application Priority Data

Oct. 1, 2004 (DE) ........................ 10 2004 047 962

(51) Int. Cl.
*G01J 1/32* (2006.01)
*H01J 40/14* (2006.01)

(52) U.S. Cl. ...................... 250/205; 250/221
(58) Field of Classification Search ................ 250/221, 250/205, 208.1; 340/541, 542, 545.3; 38/312, 38/274

See application file for complete search history.

(56) References Cited

U.S. PATENT DOCUMENTS

| 5,717,379 | A | 2/1998 | Peters | 340/539 |
|---|---|---|---|---|
| 6,154,133 | A | 11/2000 | Ross et al. | 340/541 |
| 6,340,864 | B1* | 1/2002 | Wacyk | 315/158 |
| 2003/0025599 | A1* | 2/2003 | Monroe | 340/531 |
| 2003/0210340 | A1 | 11/2003 | Romanowich | 348/272 |
| 2004/0143380 | A1* | 7/2004 | Stam et al. | 701/36 |

OTHER PUBLICATIONS

Search Report from European Patent Office (for related foreign patent application) referencing the above-listed patent documents, dated Feb. 2, 2006 (5 pages total).

* cited by examiner

*Primary Examiner*—Georgia Y Epps
*Assistant Examiner*—Pascal M Bui-Pho
(74) *Attorney, Agent, or Firm*—Carlo S. Bessone

(57) ABSTRACT

A sensor system has a video camera and an evaluation unit, the evaluation unit receiving a video signal from the video camera and providing output information relating to luminance and movement of an observation space. The evaluation unit can include a microcontroller that undertakes calculations in order to provide the output information. However, the sensor system can be included in a light control system. A method for controlling an artificial light component of controllable light sources via a light control system includes: picking up a video signal, relaying the video signal to the input of the evaluation unit, evaluating the video signal with reference to luminance and movement in the evaluation unit, outputting the information relating to luminance and movement at the output of the evaluation unit to a control unit and setting a desired brightness of the controllable light sources via the control unit.

8 Claims, 1 Drawing Sheet

SYSTEM FOR EVALUATING LUMINANCE AND MOVEMENT WITHIN AN OBSERVATION SPACE, AND METHOD FOR CONTROLLING LIGHT SOURCES WITHIN THE OBSERVATION SPACE

FIELD OF THE INVENTION

The present invention relates to a sensor system having a video camera and an evaluation unit. The evaluation unit has an input and an output, the input receiving a video signal from the video camera, and the output providing output information relating to luminance and movement of an observation space. It also relates to a method for controlling an artificial light component of controllable light sources by means of a light control system. In this case, a video signal is picked up by a video camera, relayed to the input of the evaluation unit and evaluated in the evaluation unit with reference to luminance and movement. At the output of the evaluation unit, the information relating to luminance and movement is output to a control unit that sets a desired brightness of the controllable light sources.

BACKGROUND OF THE INVENTION

Light control systems are known that control or regulate artificial light as a function of movement and luminance with the aid of motion detectors (as a rule, PIR sensors) and light sensors (photoresistors or phototransistors or photodiodes). The measurement signals are fed to a controller that controls the artificial light sources. Light control systems for a number of light sources or large observation spaces require a number of motion detectors in order to cover the entire space, as well as a number of light sensors. This results overall in a large number of various sensors that must be set separately to the desired area of coverage and cause a high outlay on installation. Moreover, overlaps in the areas of coverage are often unavoidable, chiefly in the case of the light sensors, and interfere with the function. Specific areas in the field of coverage of a sensor cannot be masked out in order, for example, to exclude the interpretation of a fan as movement.

SUMMARY OF THE INVENTION

It is an object of the present invention to provide a sensor system in order to control an artificial light component.

According to the invention, a sensor system having a video camera and an evaluation unit is provided, the input of the evaluation unit receiving a video signal from the video camera, and the output of the evaluation unit providing output information relating to luminance and movement of an observation space.

The video camera of the sensor system preferably includes a CCD, MOS chip or other chip technologies in order to take up image information.

In a preferred design of the sensor system, the evaluation unit includes a microcontroller or a digital signal processor (DSP) that undertakes calculations in order to provide the output information. In the case of relatively large light systems, these calculations can also be executed by a computer system having equipment for processing video signals.

A particularly preferred embodiment of the sensor system provides dividing the observation space into various zones and weighting the latter differently during an evaluation. For example, it is also possible to provide a large observation space for the coverage of movement, and to perform the coverage of the luminance only in a section of the large observation space.

Further preferred embodiments follow from the subclaims.

BRIEF DESCRIPTION OF THE DRAWINGS

The invention is to be explained in more detail below with the aid of exemplary embodiments and with reference to drawings, in which.

DETAILED DESCRIPTION OF THE INVENTION

Figure 1:
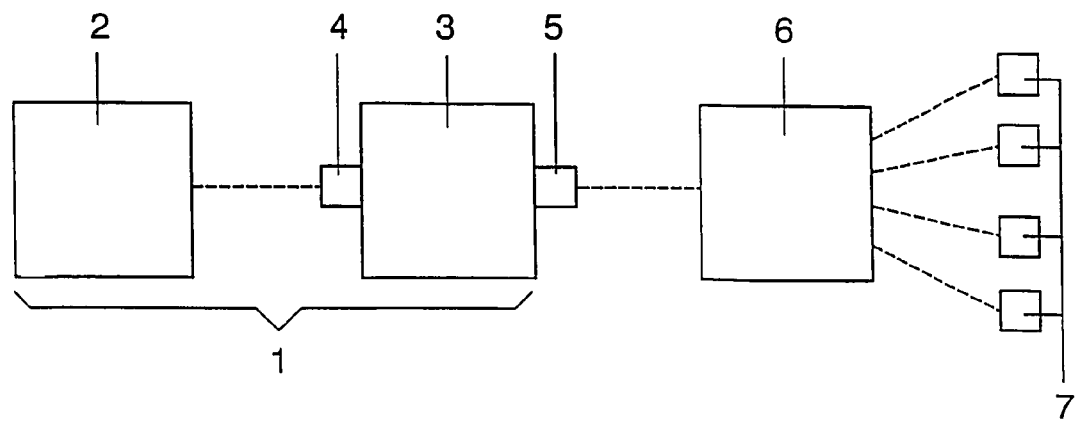
FIG. 1 shows a schematic of the design of a system for controlling an artificial light component.

FIG. 1 shows the design of a system for controlling an artificial light component. The light control system includes the sensor system 1 and the control unit 6. A video camera 2 picks up a video image of an observation space. The video camera 2 is connected to an evaluation unit 3 and relays the video signal to the input 4 of the evaluation unit 3. The video camera 2 and the evaluation unit 3 form the sensor system 1. The video signal is evaluated in the evaluation unit 3 with reference to luminance and movement in the observation space. The evaluation unit 3 is connected to the control unit 6. The control unit 6 obtains the information relating to luminance and movement from the output 5 of the evaluation unit 3. The control unit 6 sets the desired brightness of the controllable light sources 7.

Figure 2:
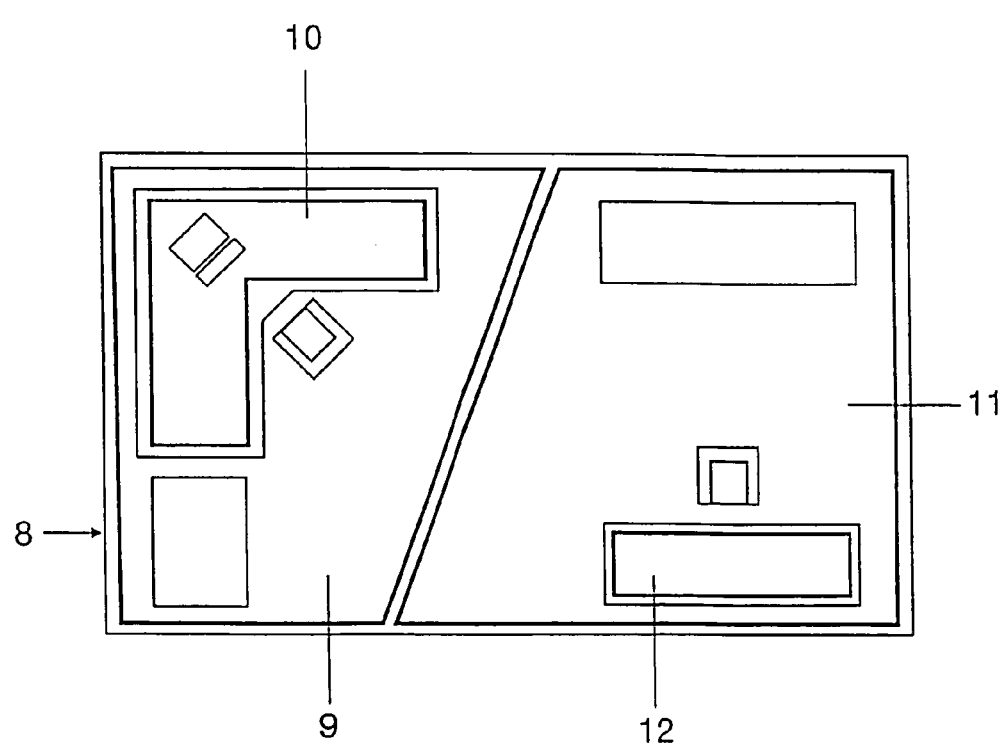
FIG. 2 shows a schematic of a video image having various zones that can be differently weighted during evaluation.

FIG. 2 shows a video image of an observation space 8 that relates to an office situation. Depicted on the video image are various zones 9-12 that are to be differently weighted in the exemplary embodiment during evaluation with reference to movement and luminance. The video image can, for example, be divided into a zone 9 for information relating to movement over a first workspace, a zone 10 (desk) for information relating to luminance over the first workspace, a zone 11 for information relating to movement over a second workspace, and a zone 12 for information relating to luminance over the second workspace.

The invention claimed is:

1. A system comprising:
a video camera for providing a single video signal representative of an observation space;
an evaluation unit, said evaluation unit having an input and an output, wherein the input receives the video signal from the video camera and the output provides output information relating to luminance and movement of the observation space, wherein the evaluation unit is further operable to process the single video signal to: (i) divide the observation space into various zones; and (ii) weight each zone for luminance and for movement during an evaluation wherein a weight of a zone for luminance is independent of a weight for the zone for movement, and wherein the evaluation unit is operable to disregard at least one of the following information: luminance and movement in at least one zone; wherein the evaluation unit is operable to assign a weight of zero to the disregarded information; and wherein the output information relating to luminance and movement of the observation space provided by the output of the evaluation unit further comprises information relating to luminance and movement of the zones of the observation space; and
a control unit for receiving the output information from the evaluation unit and setting a brightness of a plurality of controllable light sources as a function of the output information, wherein each controllable light source illuminates at least one zone, wherein setting a particular one of the controllable light sources comprises controlling the brightness of the particular controllable light source in response to detecting movement in a zone illuminated by the particular light source.

2. The system as claimed in claim 1, characterized in that the video camera includes a CCD or MOS chip.

3. The system as claimed in claim 2 characterized in that the evaluation unit includes a microcontroller or DSP that undertakes calculations in order to provide the output information.

4. The system as claimed in claim 2, characterized in that the evaluation unit includes a computer system with equipment for processing video signals that undertakes calculations in order to provide the output information.

5. The system as claimed in claim 1, characterized in that the evaluation unit includes a microcontroller or DSP that undertakes calculations in order to provide the output information.

6. The system as claimed in claim 1, characterized in that the evaluation unit includes a computer system with equipment for processing video signals that undertakes calculations in order to provide the output information.

7. The system as claimed in claim 1, characterized in that the video camera can be used for monitoring purposes.

8. A method for controlling light sources within an observation space, the method comprising the steps of:
picking up a single video signal representative of the observation space by a video camera;
relaying the video signal to the input of the evaluation unit;
processing the single video signal to divide the observation space into a plurality of zones;
assigning weights to each of the zones for luminance and for movement wherein a weight of a zone for luminance is independent of a weight for the zone for movement;
evaluating the video signal with reference to luminance and movement in the evaluation unit, wherein the step of evaluating is performed in dependence upon the weights assigned to each of the zones;
outputting the information relating to luminance and movement of the observation space at the output of the evaluation unit to a control unit;
setting a desired brightness of each of a plurality of light sources by means of the control unit in accordance with prescribed setpoints, wherein setting the desired brightness comprises controlling the brightness of the light source corresponding to a zone of the plurality of zones in which movement is detected; and
disregarding at least one of the following information: luminance and movement, in at least one zone; wherein disregarding comprises assigning a weight of zero to the disregarded information; and wherein outputting the information relating to luminance and movement comprises outputting the information relating to luminance and movement of each zone of the observation space at the output of the evaluation unit to the control unit.

* * * * *